(12) United States Patent
Lee (10) Patent No.: US 7,345,683 B2
(45) Date of Patent: Mar. 18, 2008

(54) DRIVER CIRCUIT FOR DRIVING DISPLAY DEVICE, A DISPLAY DEVICE HAVING THE SAME, AND A METHOD OF DRIVING THE SAME

(75) Inventor: Sung-Ho Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 653 days.

(21) Appl. No.: 10/847,760

(22) Filed: May 18, 2004

(65) Prior Publication Data

US 2005/0007358 A1 Jan. 13, 2005

(30) Foreign Application Priority Data

May 20, 2003 (KR) ...................... 10-2003-0032062

(51) Int. Cl.
*G09G 5/00* (2006.01)
(52) U.S. Cl. ........................................ 345/204; 345/52
(58) Field of Classification Search .................. 326/86, 326/87; 345/83–100, 204, 211, 173, 156, 345/51–55, 77
See application file for complete search history.

(56) References Cited

U.S. PATENT DOCUMENTS

| | | | | |
|---|---|---|---|---|
| 5,621,437 A | * | 4/1997 | Jeong | .......................... 345/173 |
| 5,764,225 A | * | 6/1998 | Koshobu | ..................... 345/211 |
| 6,542,142 B2 | * | 4/2003 | Yumoto et al. | ............... 345/90 |
| 7,009,426 B2 | * | 3/2006 | Dosho et al. | .................. 326/93 |
| 7,019,735 B2 | * | 3/2006 | Sasaki et al. | ................ 345/204 |
| 2002/0149392 A1 | * | 10/2002 | Cho | ........................... 326/87 |
| 2004/0189611 A1 | * | 9/2004 | Matsumoto et al. | ......... 345/173 |
| 2005/0174145 A1 | * | 8/2005 | Dosho et al. | .................. 326/86 |
| 2005/0259063 A1 | * | 11/2005 | Kwon | .......................... 345/98 |

\* cited by examiner

*Primary Examiner*—Nitin I. Patel
(74) *Attorney, Agent, or Firm*—Cantor Colburn LLP (57) ABSTRACT

A driver circuit for driving a display device, and the driver circuit includes a control section, a driving section and a switch. The control section provides an image signal and a first control signal in response to a power signal. The driving section receives the first control signal and the image signal from the control section to output a scan signal or the image signal in response to the first control signal. The switch is coupled to the control section, and provides the control section with the power signal in response to a second control signal so that the power signal is selectively provided to the control section during a predetermined period. Therefore, the power consumption of the display device may be reduced.

19 Claims, 8 Drawing Sheets

DRIVER CIRCUIT FOR DRIVING DISPLAY DEVICE, A DISPLAY DEVICE HAVING THE SAME, AND A METHOD OF DRIVING THE SAME

CROSS-REFERENCE TO RELATED APPLICATIONS

This application relies for priority upon Korean Patent Application No. 2003-32062 filed on May 20, 2003, the contents of which are herein incorporated by reference in its entirety.

BACKGROUND OF THE INVENTION

1. Field of the Invention

The present invention relates to a driver circuit for driving a display device, a display device having the same, and a method of driving the driver circuit for driving the display device, more particularly to a driver circuit for driving a display device capable of reducing power consumption thereof.

2. Description of the Related Art

A mobile communication terminal such as a mobile phone is divided into a flip type and a folder type, etc. In a flip type mobile phone, a display panel for displaying an image is exposed outside the mobile phone. A folder type mobile phone is folded while not in use. The folder type mobile phone includes a key pad part and a display panel part, and the key pad part has a hinge attaching the key pad part to the display panel part so that the display panel faces the display panel.

The folder type is divided into a general folder type and a dual folder type.

The dual folder type mobile phone has a main display panel part and an additional display part (or a sub display panel part). The main display panel part displays main image information, and the sub display panel part displays sub information such as time, date, receive sensitivity, etc.

The main display panel part is not exposed externally in a folded state, and the sub display panel part is disposed on the outside of an upper folder for allowing a user to view the sub information even when the upper folder is in the folded state.

The sub display panel part displays the sub information while the phone is turned on, not only while the line is occupied but also while the line is not occupied. Thus, most of power is consumed in the sub display part.

In dual folder type, the sub display part has smaller size and smaller resolution compared with the main display panel part, and thus the power consumption of the dual folder type mobile phone is smaller than that of the flip type mobile phone. The flip type mobile phone does not have an additional sub display panel part, and the sub information is displayed on a main display panel part.

Especially, a size of the main display panel part of the flip type mobile phone is larger than that of the main display panel part of the dual folder mobile phone, and thus the power consumption of the flip type is larger than that of the dual folder.

A driver circuit for driving a liquid crystal display (LCD) panel is turned on not only while the line is occupied but also while the mobile phone is in a standby mode. In addition, most of power of the LCD panel is consumed at the driver circuit. Therefore, the conventional mobile phone having the LCD panel wastes unnecessary power consumption in the standby mode, or while the mobile phone is not in use.

SUMMARY OF THE INVENTION

Accordingly, the present invention is provided to substantially obviate one or more problems due to limitations and disadvantages of the related art.

It is a first feature of the present invention to provide a driver circuit for driving a display device, which may reduces power consumption.

It is a second feature of the present invention to provide a display device having the driver circuit.

It is a third feature of the present invention to provide a method of driving the driver circuit.

In one aspect of the first feature of the present invention, there is provided a driver circuit for driving a display device. The driver circuit includes a control section, a driving section and a switch. The control section provides an image signal and a first control signal in response to a power signal. The driving section receives the first control signal and the image signal from the control section to output a scan signal or the image signal in response to the first control signal. The switch is coupled to the control section, and provides the control section with the power signal in response to a second control signal so that the power signal is selectively provided to the control section during a predetermined period. For example, the switch may include a transistor of which a control electrode receiving the second control signal, of which a first current electrode receives the power signal, and of which a second current electrode is coupled to the control section. For example, the switch may include a transistor of which a control electrode receiving the second control signal, of which a first current electrode is coupled to an earth potential, and of which a second current electrode is coupled to the control section. The driving section may include a gate driver for outputting the scanning signal in response to a gate control signal, and a source driver for outputting the image signal in response to a source control signal, the first control signal having the gate control signal and the source control signal.

In another aspect of the first feature of the present invention, the control section of the driver circuit includes provides an image signal and a first control signal in response to a power signal. A driving section receives the first control signal and the image signal from the control section to output the image signal in response to the first control signal. A switch is coupled to the control section, and provides the control section with the power signal in response to a second control signal so that the power signal is selectively provided to the control section during a predetermined period.

In still another aspect of the first feature of the present invention, there is provided a driver circuit including a control section and a switch. The control section provides an image signal and a first control signal in response to a power signal to a driving section, and the driving section outputs the image signal to the display device to drive the display device. The switch is coupled to the control section, and provides the control section with the power signal in response to a second control signal so that the power signal is selectively provided to the control section during a predetermined period.

In one aspect of the second feature of the present invention, there is provided a display device including a first display panel for displaying first information and above described driver circuit. The display device may further include a second display panel, and the driver circuit may drive the second display panel.

In one aspect of the third feature of the present invention, there is provided a method of driving the driver circuit for driving the display device. A power signal is provided in response to a first control signal so that the power signal is selectively provided to the control section during a first predetermined period. An image signal and a second control signal are provided in response to the power signal during substantially the first predetermined period. The display device is provided with a scan signal and the image signal in response to the second control signal during substantially the first predetermined period to drive the display device. Said providing the power signal may switch the power signal in response to a first control signal to provide the power signal. The first control signal may prevent the power signal from being provided to the control section during a second predetermined period so that the display device is prevented from being provided with the scan signal and the image signal. The display device may include a first display panel on which a first information is displayed and a second display panel on which a second information is displayed, and the first control signal may prevent the power signal from being provided to the control section during a second predetermined period so that the first display panel is prevented from displaying the first information.

According to the present invention, the switch is disposed between the power signal generator and the control section, prevents the power signal from being provided to the control section in the standby mode, or while the mobile phone is not in use.

Therefore, the control section of the driver circuit does not operate in the standby mode, or while the mobile phone is not in use, and the power consumption of the display device may be reduced.

BRIEF DESCRIPTION OF THE DRAWINGS

The above and other advantages of the present invention will become more apparent by describing in detail the preferred embodiments thereof with reference to the accompanying drawings, in which.

DESCRIPTION OF EMBODIMENTS

Hereinafter the preferred embodiment of the present invention will be described in detail with reference to the accompanying drawings.

Figure 1:
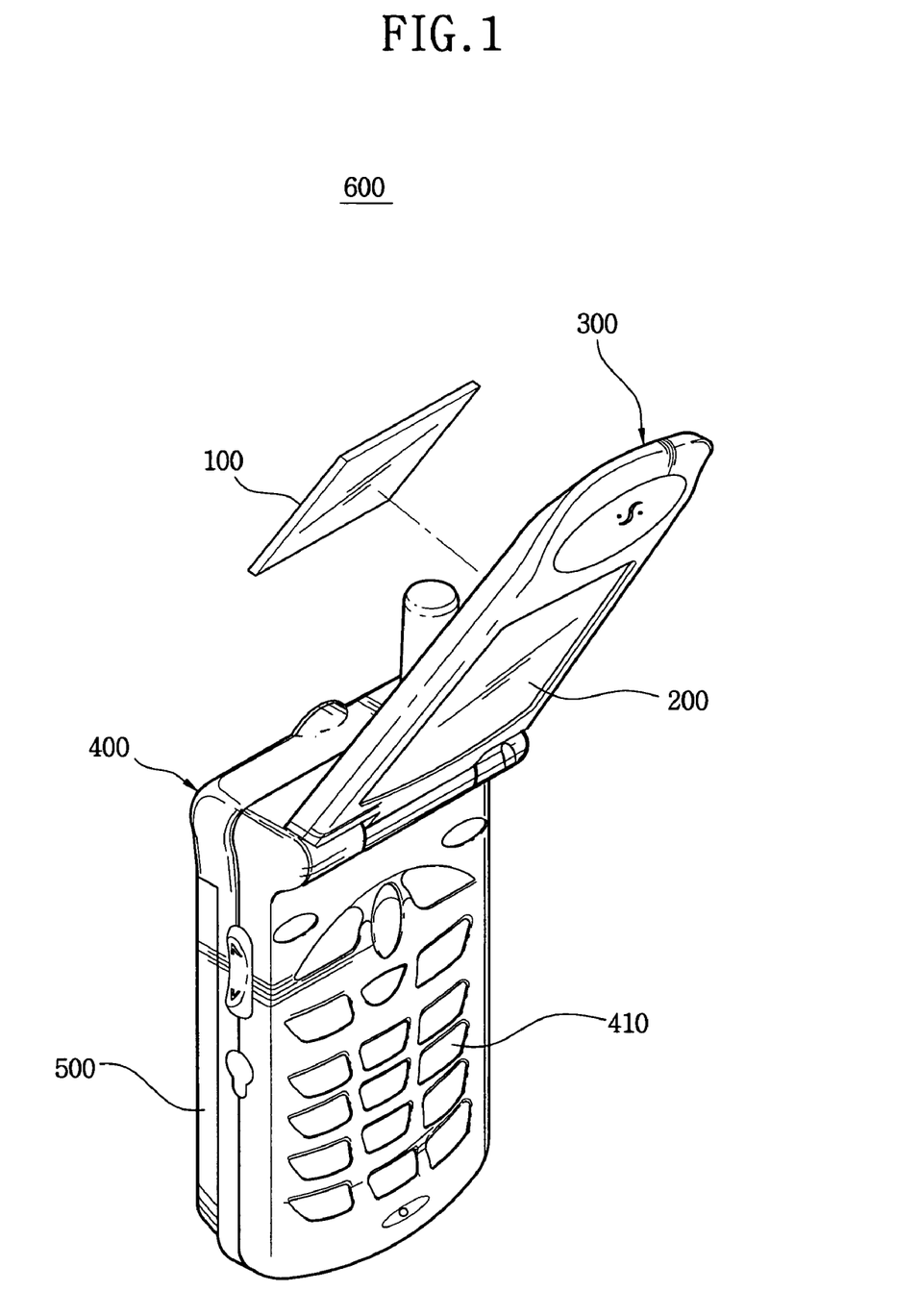
FIG. 1 is a perspective view showing mobile phone according to one exemplary embodiment of the present invention.
Figure 2:
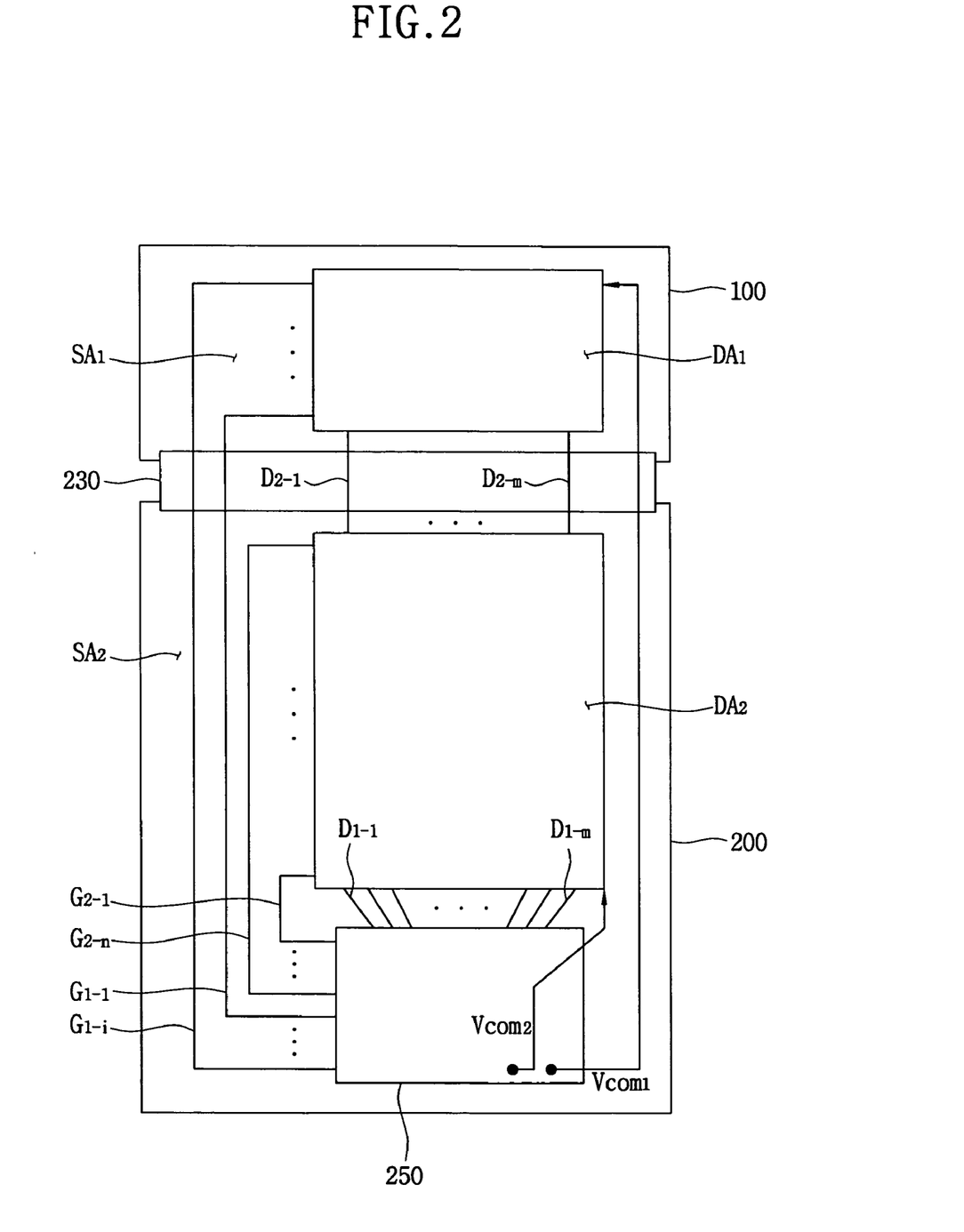
FIG. 2 is a schematic view showing first and second display panel of FIG. 1.

FIG. 1 is a perspective view showing mobile phone according to one exemplary embodiment of the present invention, and FIG. 2 is a schematic view showing first and second display panel of FIG. 1.

Referring to FIG. 1, the mobile phone 600 includes liquid crystal display device 300, a control module 400, a power supplying module 500.

The LCD device 300 displays information in response to a power voltage signal supplied from the power supplying module 500.

The control module 400 is combined with the LCD device 300.

The power supplying module 500 is removably combined with the rear side of the control module 400, and supplies the power voltage signal to the LCD device 300 and the control module 400.

The LCD device 300 and the control module 400 are hinged together, so that the control module 400 is not exposed externally in a folded state.

The LCD device 300 includes a first LCD panel 100 for displaying sub information such as time, date, receive sensitivity, etc., and a second LCD panel 200 for displaying main information. The first LCD panel 100 displays sub information while a user does not operate the mobile phone, or in a standby mode. The second LCD panel 200 displays the main information while the user operates the mobile phone.

The second LCD panel 200 has a screen size larger than the first LCD panel 100, and has a resolution larger than the first LCD panel 100.

The first LCD panel 100 is disposed on the outside of the LCD device 300 to be exposed externally, and allows the user to view the sub information even when the mobile phone 600 is in a folded state. The second LCD panel 200 is disposed inside the LCD device 300 to be exposed externally when the mobile phone 600 is in an unfolded state, or is not exposed externally when the mobile phone 600 is in the folded state.

The control module 400 includes a key pad part 410 for receiving input instruction of a user via input buttons. The control module 400 generates control signals used for displaying information on the first and second LCD panels 100 and 200, and sends the control signals to the LCD device 300.

Referring to FIG. 2, the first LCD panel 100 includes a first display region DA1 on which the sub information is displayed and a first peripheral region SA1 surrounding the first display region DA1. The second LCD panel 200 includes a second display region DA2 on which the main information is displayed and a second peripheral region SA2 surrounding the second display region DA2.

The size of the second LCD panel 200 may be larger than that of the first LCD panel 100, and thus the size of the second display region DA2 may be larger than that of the first display region DA1. In addition, the resolution of the second display region DA2 may be higher than that of the first display region DA1. For example, the resolution of the first LCD panel 100 is 172×132, and the resolution of the second LCD panel 200 is 172×240.

The first and second LCD panels 100 and 200 are electrically connected to each other through a flexible printed circuit board (FPC) 230. A first end of the FPC 230 is attached to the first peripheral region SA1 and a second end of the FPC 230 is attached to the second peripheral region SA2.

An integrated driver chip 250 is mounted on the second peripheral region SA2. The integrated driver chip 250 outputs first and second driving signal for driving the first and second LCD panels 100 and 200, respectively. The integrated driver chip 250 is electrically connected to the first LCD panel 100 via the FPC 230. Thus, the first driving signal outputted from the integrated driver chip 250 is applied to the first LCD panel 100. The integrated driver chip 250 includes first gate-side output terminals G1-1, G1-2, ..., G1-i and second gate-side output terminals G2-1, G2-2, ..., G2-n. i and n are a natural number higher than 2, and i is less than or equal to n. First scanning signals are outputted to the first display region DA1 via the first gate-side output terminals G1-1, G1-2, ..., G1-I, and second scanning signals are outputted to the second display region DA2 via the second gate-side output terminals G2-1, G2-2, ..., G2-n.

In case the resolution of the first LCD panel 100 is 172×132 and the resolution of the second LCD panel 200 is 172×240, i is 132 and n is 240.

The integrated driver chip 250 includes source output terminals D1-1, D1-2, ..., D1-m for outputting first and second image signals to the first display region DA1.

Wirings D2-1, D2-2, ..., D2-m are disposed between the first display region DA1 and the second display region DA2. The first image signal is transmitted to the first display region DA1 via the wirings D2-1, D2-2, ..., D2-m. m is the natural number higher than 2. In case the resolution of the second LCD panel 200 is 172×240, m is 172.

There is one-to-one correspondence between the wirings D2-1, D2-2, ..., D2-m and the source output terminals D1-1, D1-2, ..., D1-m. Thus, In case the resolution of the first LCD panel 100 is 172×132 and the resolution of the second LCD panel 200 is 172×240, the number of the wirings D2-1, D2-2, ..., D2-m is 172 and is the same as the number of the source output terminals D1-1, D1-2, ..., D1-m.

The number of the wirings D2-1, D2-2, ..., D2-m may be less than the number of the source output terminals D1-1, D1-2, ..., D1-m.

The integrated driver chip 250 includes a first common voltage terminal Vcom1 and a second common voltage terminal Vcom2. A first common voltage is outputted to the first display region DA1 via the first common voltage terminal Vcom1, and a second common voltage is outputted to the second display region DA2 via the second common voltage terminal Vcom2.

Thus, the first display region DA1 displays the sub information in response to the first scan signals, the first image signals and the first common voltage, and the second display region DA2 displays the main information in response to the second scan signals, the second image signals and the second common voltage.

The first gate-side output terminals G1-1, G1-2, ..., G1-i and the second gate-side output terminals G2-1, G2-2, ..., G2-n may be disposed in a first side of the integrated driver chip 250. However, the first gate-side output terminals G1-1, G1-2, ..., G1-i may be disposed in the first side and a second side of the integrated driver chip 250, and the second gate-side output terminals G2-1, G2-2, ..., G2-n may be disposed in the first side and the second side of the integrated driver chip 250.

Figure 3:
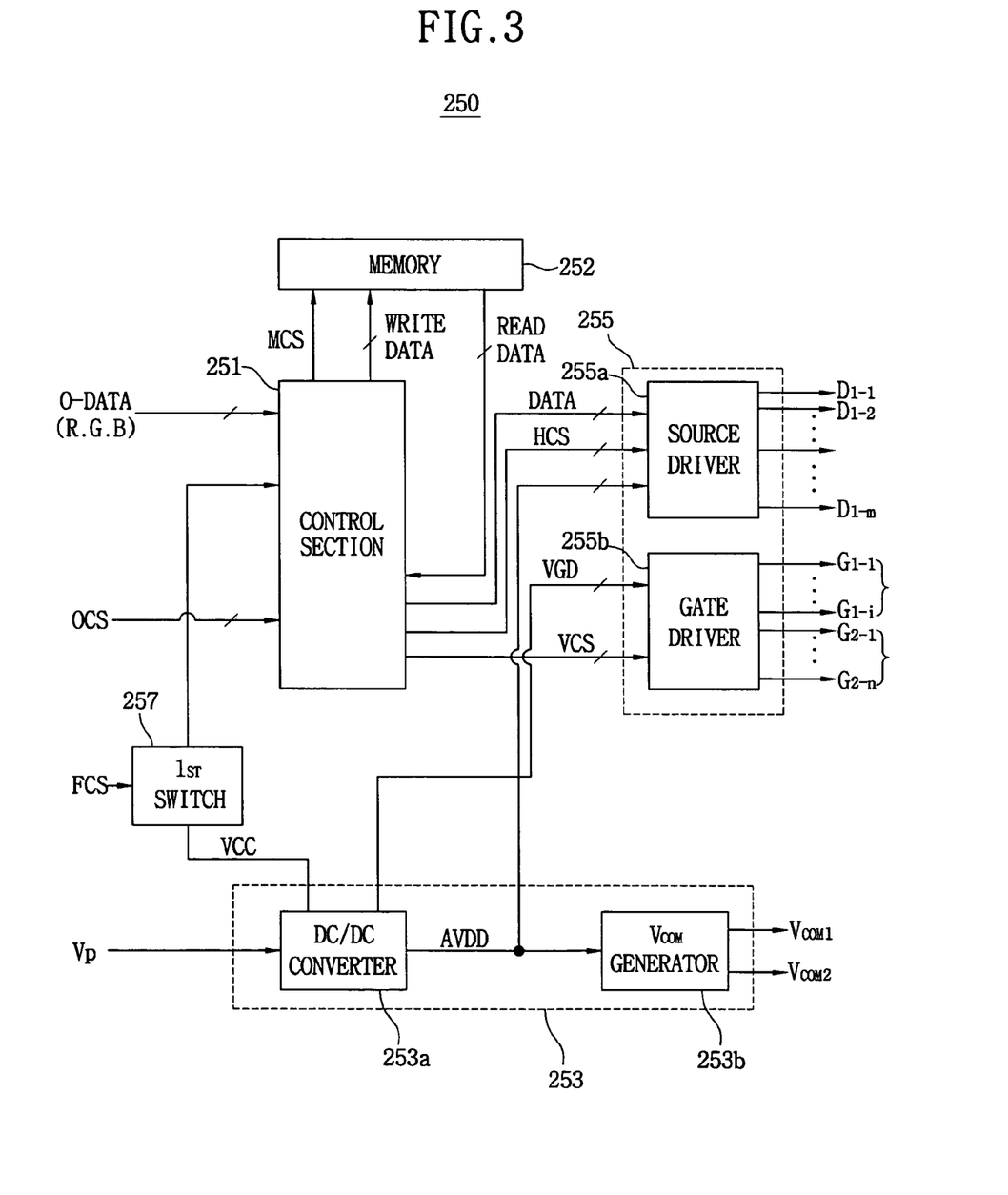
FIG. 3 is a block diagram showing a driver circuit implemented in an integrated driver chip of FIG. 2 according to one exemplary embodiment of the present invention.
Figure 4:
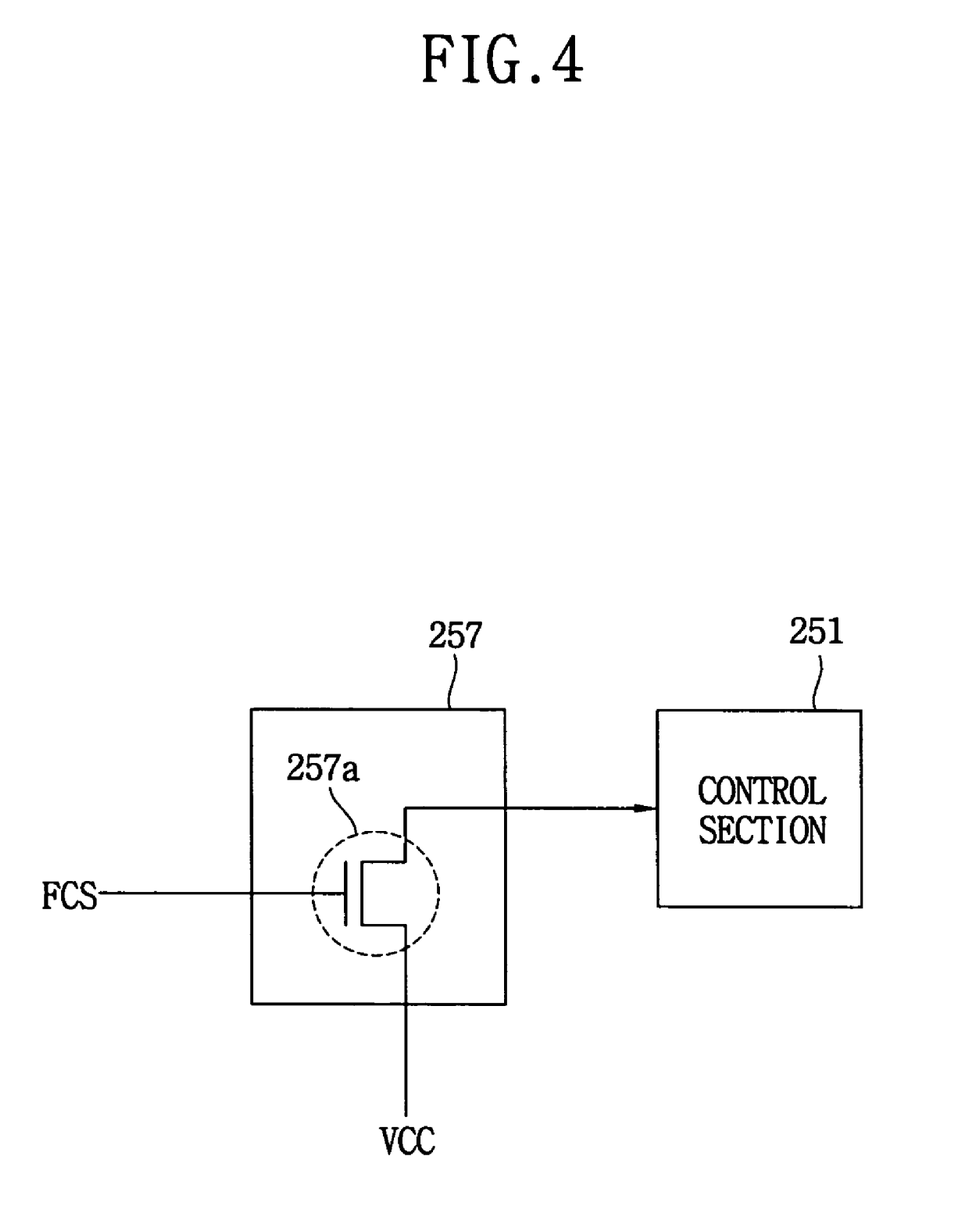
FIG. 4 is schematic view showing a first switch of FIG. 3.

FIG. 3 is a block diagram showing a driver circuit implemented in an integrated driver chip of FIG. 2 according to one exemplary embodiment of the present invention, and FIG. 4 is schematic view showing a first switch of FIG. 3.

Referring to FIGS. 2 and 3, the integrated driver chip 250 includes a control section 251, a memory 252, a power signal generator 253 and a first switch 257.

The control section receives a first power voltage signal VCC, original image signal (o-DATA) and an original control signal (OCS). The original control signal (OCS) includes a vertical synchronization signal (VCS), a horizontal synchronization signal (HCS) and a main clock signal.

The control section 251 stores the original image signal (o-DATA) at the memory 252. The original image signal (o-DATA) includes red (R), green (G) and blue (B) data. The control section 251 reads the original image signal (o-DATA) line by line from the memory 252 in response to the original control signal (OCS). The control section 251 outputs image signal (DATA), the vertical synchronization signal (VCS) and the horizontal synchronization signal (HCS) for controlling the driving section 255.

The driving section 255 includes a source driver 255a and a gate driver 255b. The source driver 255a output the image signal (DATA) to the source output terminals D1-1, D1-2, ..., D1-m in response to the horizontal synchronization signal (HCS) outputted from the control section 251.

The source driver 255a outputs the sub information signal to the m source output terminals D1-1, D1-2, ..., D1-m when the first display region DA1 displays the sub information. The source driver 255a outputs the main information signal to the m source output terminals D1-1, D1-2, ..., D1-m when the second display region DA2 displays the main information.

The gate driver 255b sequentially outputs the scanning signal to the first or second gate-side output terminals (G1-1, G1-2, ..., G1-i, G2-1, G2-2, ..., G2-n) in response to the vertical synchronization signal (VCS).

The gate driver 255b outputs the scanning signal to the first gate-side output terminals G1-1, G1-2, ..., G1-i when the first display region DA1 displays the sub information. The gate driver 255b outputs the scanning signal to the second gate-side output terminals G2-2, ..., G2-n when the second display region DA2 displays the main information.

The power signal generator 253 includes a DC-to-DC converter 253a and a common voltage generator (or Vcom generator) 253b. The DC-to-DC converter 253a receives a power voltage signal Vp from an external power source, and lowers the voltage level of the power voltage signal Vb to voltage levels respectively appropriate for driving the control section 251, the driving section 255 and the Vcom generator 253b to supply the level-shifted power voltage signal to the driving section 255, the Vcom generator 253b and the first switch 257.

The DC-to-DC converter 253a outputs the first power voltage signal VCC for driving the control section 251. In addition, the DC-to-DC converter 253a outputs a second power voltage signal AVDD for driving the source driver 25a and the Vcom generator 253b, and outputs a third power voltage signal VGD for driving the gate driver 255b.

The Vcom generator 253b outputs a first common voltage Vcom1 to the first display region DA1 and a second common voltage Vcom2 to the second display region DA2.

The first switch 257 is coupled between DC-to-DC converter 253a and the control section 251, and selectively applies the first power voltage signal VCC to the control section 251 in response to a first control signal FCS so that the power voltage signal VCC is selectively provided to the control section 251 during a predetermined period when the user operates the mobile phone.

As shown in FIG. 4, the first switch 257 includes a first transistor 257a. A control electrode of the first transistor 257a receives the first control signal FCS, a first current electrode of the first transistor 257a receives the first power voltage signal VCC, and a second current electrode of the first transistor 257a is connected to the control section 251. For example the first transistor 257a is NMOS transistor or PMOS transistor. In addition, the switch 257 may be any other switching device that switches the first power voltage signal VCC in response to the first control signal FCS.

The first power voltage signal VCC is not applied to the control section 251 when the first transistor 257a is turned off in response to the first control signal FCS. The first power voltage signal VCC is provided to the control section 251 when the first transistor 257a is turned on in response to the first control signal FCS. Therefore, the switch 257 control the control section so that the power voltage signal VCC is provided to the control section 251 in response to the first power voltage signal VCC. For example, the first control signal FCS is an ON/OFF signal. The first control signal FCS may be generated in response to the instruction of the user while the user inputs the instruction via the key pad part 410. The first control signal FCS may be generated by a hardware or a software program in response to the instruction of the user.

Although the power signal generator 253 is implemented in the integrated driver chip 250 in FIG. 3, the power signal generator 253 may be implemented outside the integrated driver chip 250. When the power signal generator 253 may be implemented outside the integrated driver chip 250, the first switch 257 is coupled between the power signal generator 253 and the control section 251. Thus, the first switch 257 receives the first power voltage signal VCC from outside the integrated driver chip 250, and switches the first power voltage signal VCC to selectively apply the first power voltage signal VCC to the control section 251.

The gate driver 255b is implemented in the integrated driver chip 250 in FIG. 3. Alternately, the gate driver circuit 255b may be implemented in the first peripheral region SA1 of the first LCD panel 110 via a process in which thin film transistors (TFTs) of the first display region DA1 are fabricated. Alternately, both the gate driver circuit 255b and the source driver circuit 255a may be implemented in the first peripheral region SA1 of the first LCD panel 110 via the fabricating process in which the thin film transistors (TFTs) of the first display region DA1 are fabricated.

Figure 5:
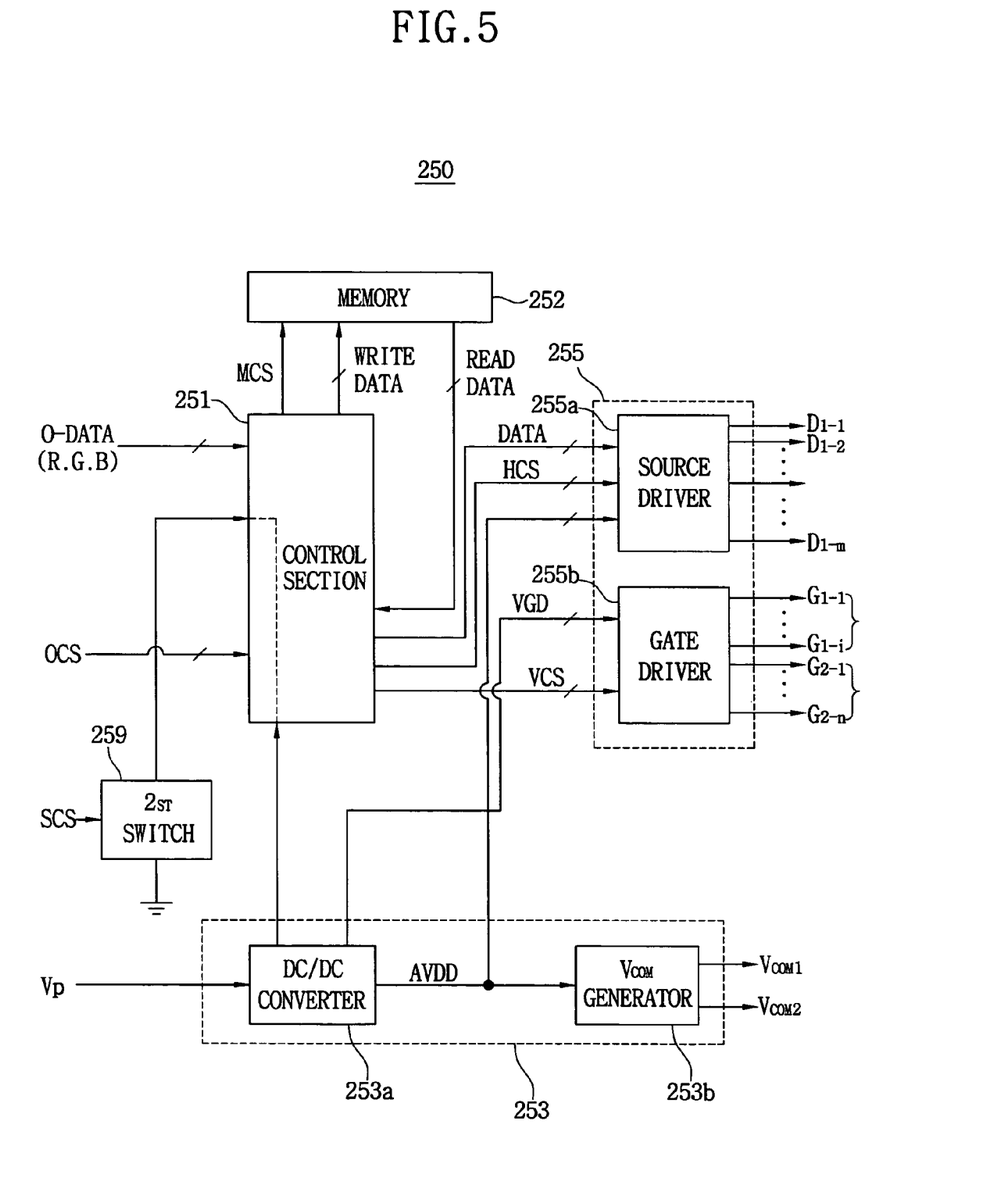
FIG. 5 is a block diagram showing a driver circuit implemented in an integrated driver chip of FIG. 2 according to another exemplary embodiment of the present invention.
Figure 6:
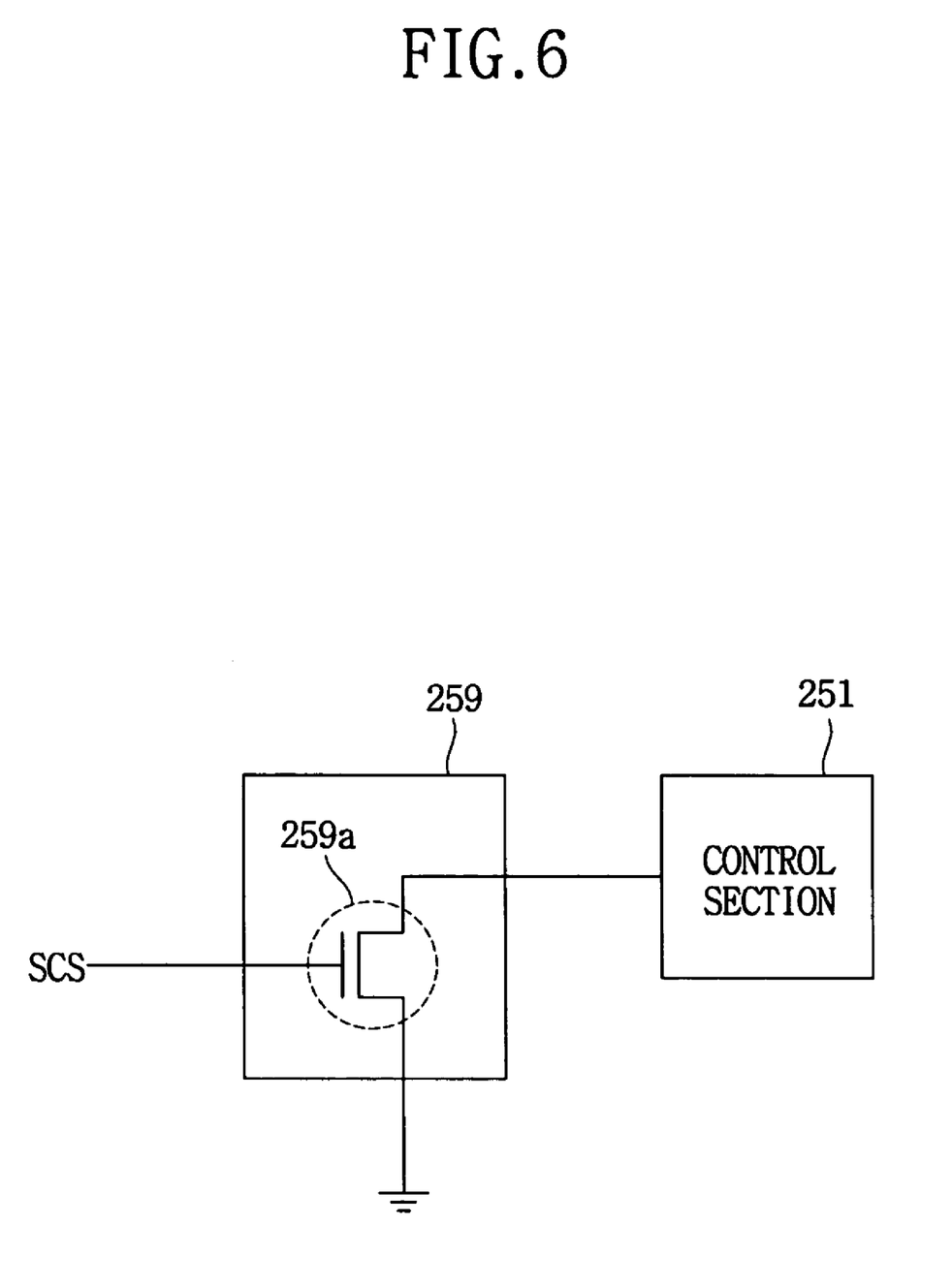
FIG. 6 is schematic view showing a second switch of FIG. 5.

FIG. 5 is a block diagram showing a driver circuit implemented in an integrated driver chip of FIG. 2 according to another exemplary embodiment of the present invention, and FIG. 6 is schematic view showing a second switch of FIG. 5. In the following drawings, the same reference numbers will be used to refer to the same or like parts as those shown in the previous drawings, FIGS. 3 and 4, and thus the detailed descriptions of the same elements will be omitted.

Referring to FIG. 5, the integrated driver chip 250 includes a control section 251, a memory 252, a power signal generator 253 and a second switch 259.

The control section 251 receives the first power voltage signal VCC, original image signal (o-DATA) and the original control signal (OCS). The original control signal (OCS) includes the vertical synchronization signal (VCS), the horizontal synchronization signal (HCS) and the main clock signal.

The second switch 259 is coupled between the control section 251 and an earth potential GND, and discharges the first power voltage signal VCC to the earth potential in response to a second control signal SCS so that the first power voltage signal VCC is selectively provided to the control section 251 during a predetermined period.

As shown in FIG. 6, the second switch 259 includes a second transistor 259a. A control electrode of the second transistor 259a receives the second control signal SCS, a first current electrode of the second transistor 259a is connected to the earth potential GND, and a second current electrode of the second transistor 259a is connected to the control section 251. For example the second transistor 259a is NMOS transistor or PMOS transistor. In addition, the switch 257 may be any other switching device that switches the first power voltage signal VCC in response to the second control signal SCS.

The first power voltage signal VCC is discharged to the earth potential GND when the second transistor 259a is turned on in response to the second control signal SCS. The first power voltage signal VCC is provided to the control section 251 when the second transistor 259a is turned on in response to the second control signal SCS. Therefore, the switch 257 control the control section 251 so that the power voltage signal VCC is provided to the control section 251 in response to the first power voltage signal VCC. For example, the second control signal SCS is an ON/OFF signal. The second control signal SCS may be generated in response to the instruction of the user while the user inputs the instruction via the key pad part 410. The second control signal FCS may be generated by a hardware or a software program in response to the instruction of the user.

Figure 7:
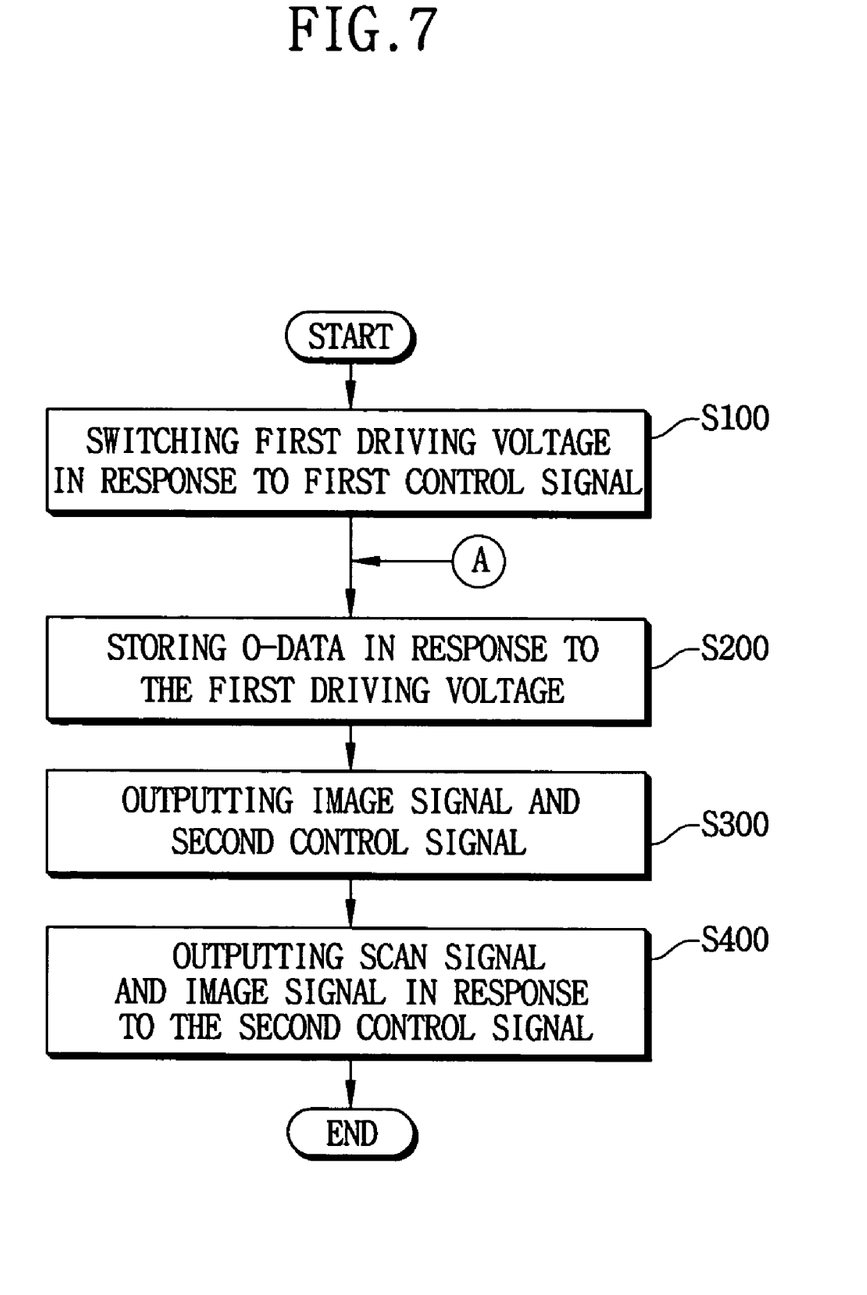
FIG. 7 is a flow chart showing a method of driving the driver circuit of FIG. 3.
Figure 8:
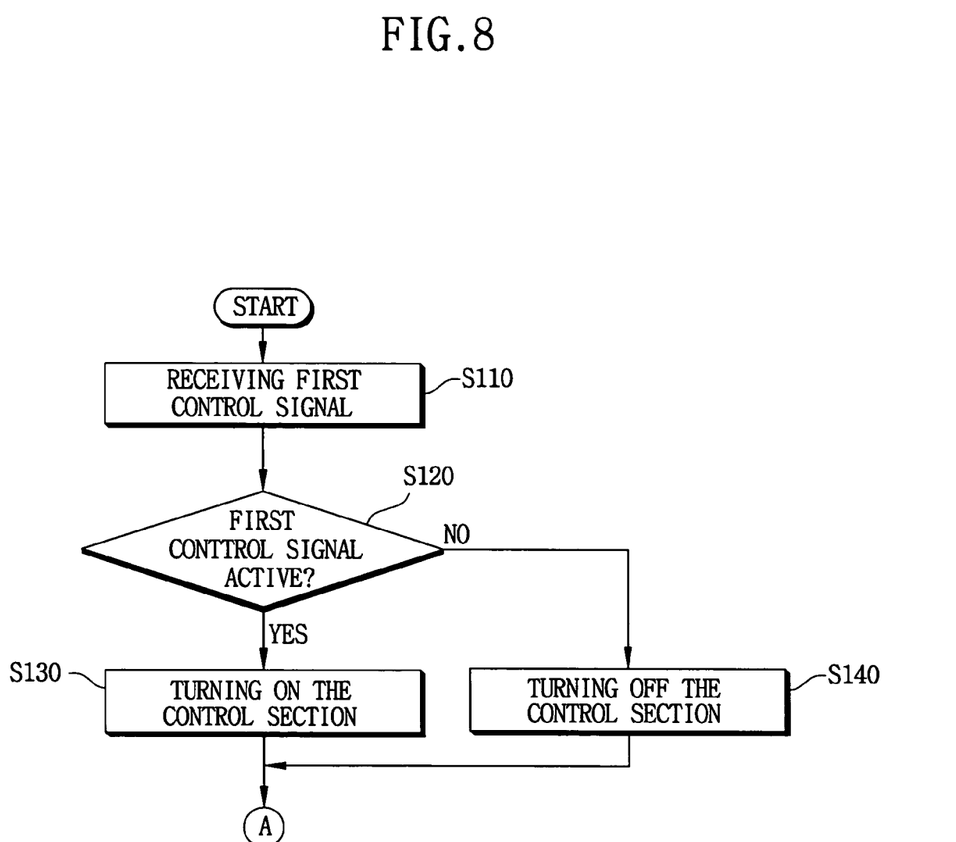
FIG. 8 is a flow chart showing detailed steps of step S100 and S200.

FIG. 7 is a flow chart showing a method of driving the integrated driver circuit of FIG. 3, and FIG. 8 is a flow chart showing detailed steps of step S100 and S200. FIGS. 7 and 8 shows an operation of the integrated driver circuit 250 when the sub information is displayed on the first display region DA1. However, the method of driving the integrated driver circuit may be used when the main information is displayed on the second display region DA2.

Referring to FIGS. 3, 7 and 8, the first switch 257 receives the first power voltage signal VCC (or a first driving voltage) and the first control signal FCS, and switches the first driving voltage in response to the first control signal FCS (step S100). In particular, the first switch 257 receives the first driving voltage and the first control signal FCS (step S10). The first switch 257 checks whether the first control signal FCS has an active status or an inactive status (step S120).

When the first control signal FCS is in the active status, the switch 257 provides the first power voltage signal VCC to the control section 251, and the control section 251 is turned on by the first power voltage signal VCC (step S130). The control section 251 maintains the turn on status while the first control signal FCS is in the active status. When the first control signal FCS is in the inactive status, the switch 257 prevents the first power voltage signal VCC from being provided to the control section 251, and the control section 251 is turned off (step S140). The control section 251 maintains the turn off status while the first control signal FCS is in the inactive status.

As shown in FIG. 7, when the first power voltage signal VCC is provided to the control section 251, the control section 251 stores the original image signal (o-DATA) at the memory 252 (step S200).

The control section 251 reads the original image signal (o-DATA) from the memory 252, and outputs image signal (DATA) and the horizontal synchronization signal (HCS) to the source driver 255a (step S300). Thus, the sub (or main) information signal is outputted to the source output terminals D1-1, D1-2, . . . , D1-m.

In addition, the control section 251 provides the gate driver 255b with the vertical synchronization signal (VCS) (step S300). Thus, the scan signal is outputted to the first gate-side output terminals G1-1, G1-2, . . . , G1-I (step S400).

While the exemplary embodiments of the present invention and its advantages have been described in detail, it should be understood that various changes, substitutions and alterations can be made herein without departing from the scope of the invention as defined by appended claims.

What is claimed is:

1. A driver circuit for driving a display device, the driver circuit comprising:
   a control section configured to provide an image signal and a first control signal in response to a power signal;
   a driving section configured to receive the first control signal and the image signal from the control section to output a scan signal or the image signal in response to the first control signal; and
   a switch, coupled to the control section, configured to control the control section in response to a second control signal.

2. The driver circuit of claim 1, wherein the switch includes a transistor of which a control electrode receiving the second control signal, of which a first current electrode receives the power signal, and of which a second current electrode is coupled to the control section.

3. The driver circuit of claim 1, wherein the switch includes a transistor of which a control electrode receiving the second control signal, of which a first current electrode is coupled to an earth potential, and of which a second current electrode is coupled to the control section.

4. The driver circuit of claim 1, further including a memory for storing an original image signal, and wherein the control section reads the original image signal from the memory.

5. The driver circuit of claim 1, wherein the driving section includes:
   a gate driver configured to output the scanning signal in response to a gate control signal; and
   a source driver configured to output the image signal in response to a source control signal, the first control signal having the gate control signal and the source control signal.

6. The driver circuit of claim 1, further including a power signal generator configured to receive a power voltage signal from an external power source to supply the power signal.

7. A display device comprising:
   a first display panel configured to display a first information; and
   a driver circuit configured to drive the first display panel, the driver circuit including:
      a control section configured to provide an image signal and a first control signal in response to a power signal;
      a driving section configured to receive the first control signal and the image signal from the control section to output a scan signal or the image signal in response to the first control signal; and
      a switch, coupled to the control section, configured to control the control section such that the control section output the scan signal or the image signal in response to a second control signal.

8. The display device of claim 7, further including a memory for storing an original image signal, and wherein the control section reads the original image signal from the memory.

9. The display device of claim 7, wherein the driving section includes:
   a gate driver configured to output the scanning signal in response to a gate control signal; and
   a source driver configured to output the image signal in response to a source control signal, the first control signal having the gate control signal and the source control signal.

10. The display device of claim 7, further including a second display panel, and wherein the driver circuit drives the second display panel.

11. A method of driving a driver circuit for driving a display device, the method comprising:
   providing a power signal in response to a first control signal so that the power signal is selectively provided to the control section during a first predetermined period;
   providing an image signal and a second control signal in response to the power signal during substantially the first predetermined period; and
   providing the display device with a scan signal and the image signal in response to the second control signal during substantially the first predetermined period to drive the display device.

12. The method of claim 11, wherein said providing the power signal switches the power signal in response to a first control signal to provide the power signal.

13. The method of claim 11, further including storing an original image signal.

14. The method of claim 11, wherein the first control signal prevents the power signal from being provided to the control section during a second predetermined period so that the display device is prevented from being provided with the scan signal and the image signal.

15. The method of claim 14, wherein the display device includes a first display panel on which a first information is displayed and a second display panel on which a second information is displayed, and the first control signal prevents the power signal from being provided to the control section during a second predetermined period so that the first display panel is prevented from displaying the first information.

16. A driver circuit for driving a display device, the driver circuit comprising:
   a control section configured to provide an image signal and a first control signal in response to a power signal;
   a driving section configured to receive the first control signal and the image signal from the control section to output the image signal in response to the first control signal; and
   a switch, coupled to the control section, configured to provide the control section with the power signal in response to a second control signal so that the power signal is selectively provided to the control section during a predetermined period.

17. The driver circuit of claim 16, wherein the switch includes a transistor of which a control electrode receiving the second control signal, of which a first current electrode receives the power signal, and of which a second current electrode is coupled to the control section.

18. The driver circuit of claim 16, wherein the switch includes a transistor of which a control electrode receiving the second control signal, of which a first current electrode is coupled to an earth potential, and of which a second current electrode is coupled to the control section.

19. A driver circuit for driving a display device, the driver circuit comprising:
   a control section configured to provide an image signal and a first control signal in response to a power signal to a driving section, the driving section outputting the image signal to the display device to drive the display device; and a switch, coupled to the control section, configured to provide the control section with the power signal in response to a second control signal so that the power signal is selectively provided to the control section during a predetermined period.

* * * * *